UNITED STATES PATENT OFFICE.

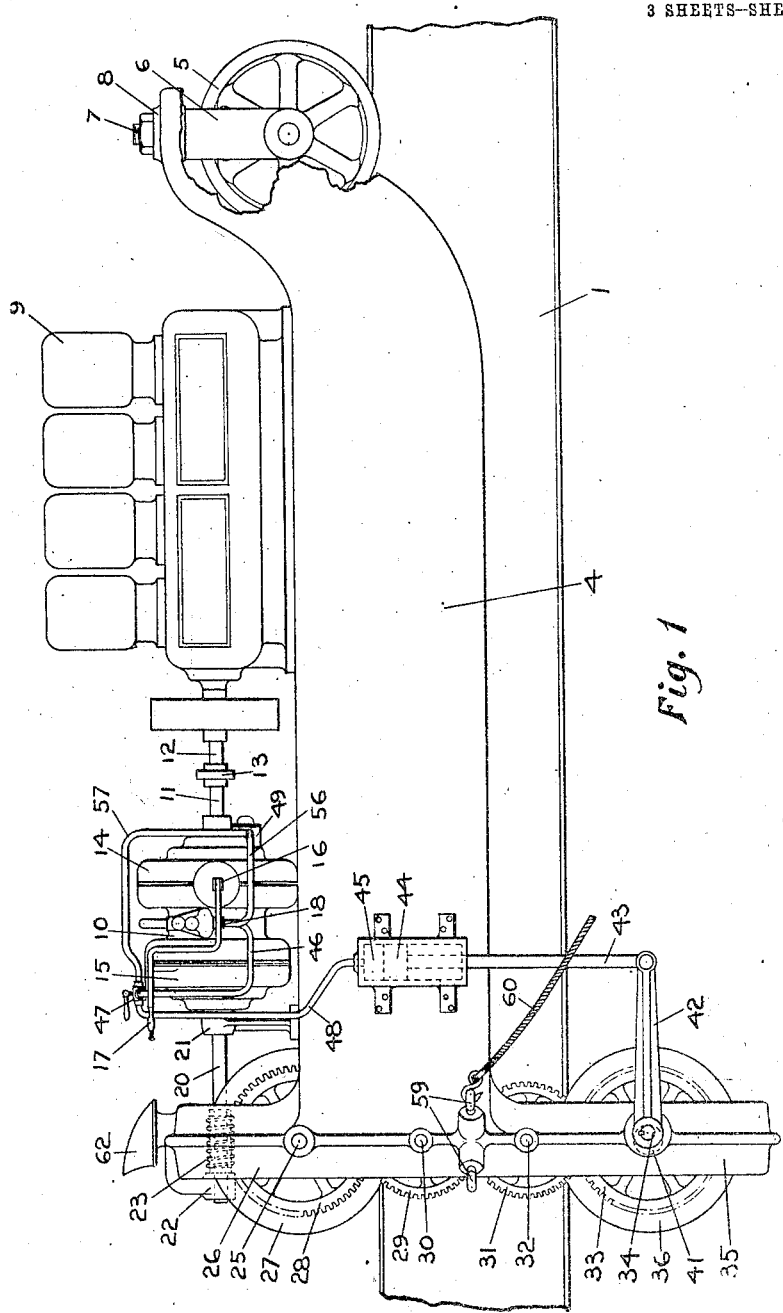

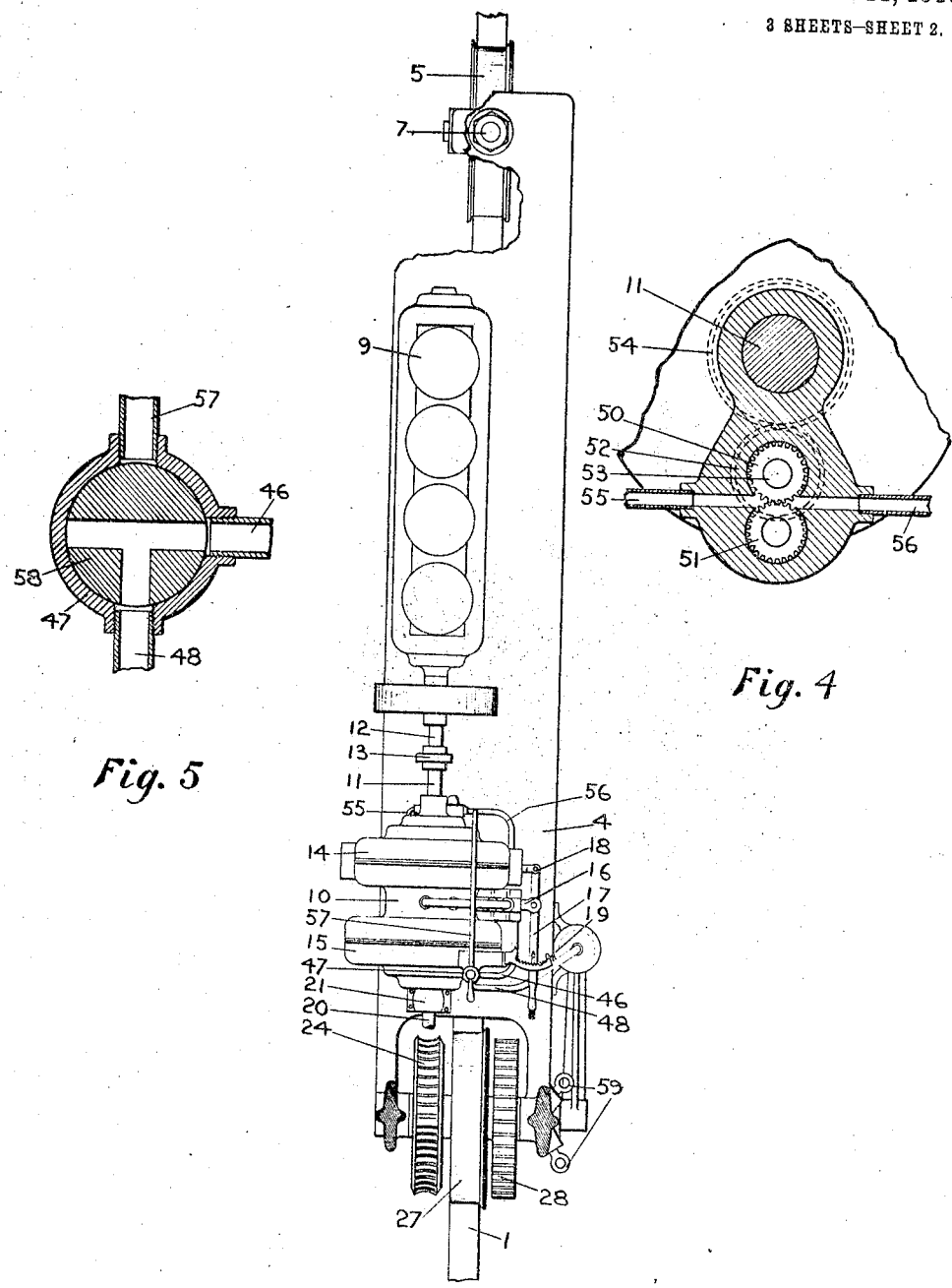

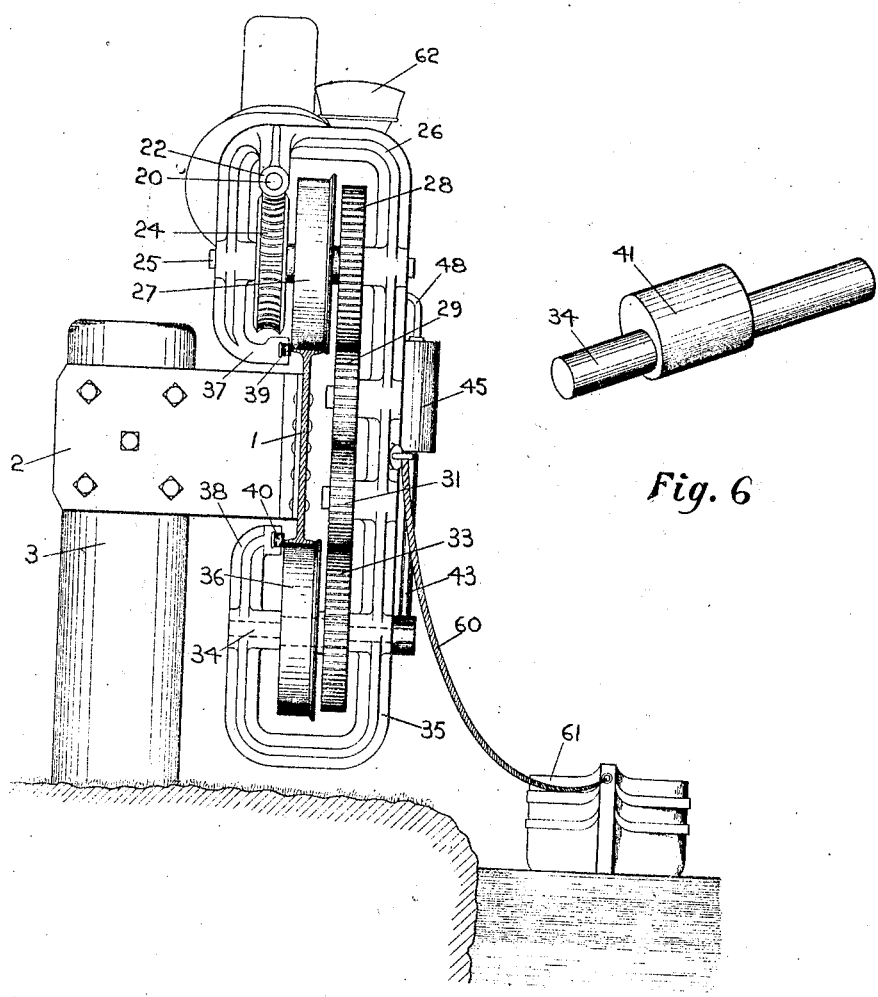

CHARLES M. MANLY, OF BROOKLYN, NEW YORK.

TRACTOR.

1,078,102.   Specification of Letters Patent.   Patented Nov. 11, 1913.

Application filed March 13, 1911. Serial No. 614,130.

*To all whom it may concern:*

Be it known that I, CHARLES M. MANLY, a citizen of the United States, residing at Brooklyn, county of Kings, and State of New York, have invented certain new and useful Improvements in Tractors, of which the following is a specification.

My invention relates to power driven tractors and particularly to that class of tractors which travel on a single rail.

One object of my invention is to provide in a tractor of the class described simple and effective means for enabling the driving wheels to grip the track with a force proportional to the tractive effort exerted.

A further object of my invention is to provide additional means for enabling the driving wheels to grip the track, not dependent on the tractive effort.

A further object of my invention is to provide means whereby the power from an explosive engine may be transmitted to the driving wheels of the tractor.

A further object of my invention is to provide means whereby the speed of the tractor may be controlled through the power transmitting means.

In the accompanying drawings and annexed specification I have disclosed a preferred embodiment of my invention. It is to be understood, however, that my invention is not limited to the details of construction here disclosed but covers all such modifications of the same as fall within the scope of the appended claims.

In the drawings, Figure 1 is a side elevation of the said embodiment of my invention. Fig. 2 is a plan view of the same. Fig. 3 is a rear elevation, the track being shown in section. Figs. 4, 5 and 6 are detail views hereinafter referred to.

Referring to the drawings, in which the same characters are used to indicate the same parts throughout the several views, 1 indicates a track, substantially I-shaped in cross section supported at a convenient distance above the ground by means of brackets 2 on parts 3, shown in Fig. 3 as arranged along the bank of a canal so that the tractor may be employed for towing the canal boats.

The frame of the tractor, indicated at 4 is supported at its forward end by a double flanged wheel 5, mounted in a fork 6 having a stem 7 swiveled in the frame at 8.
Supported on the forward part of the frame 4 is an internal combustion engine 9, which may be of any preferred type and is here shown merely in outline, and to the rear of the engine and in line therewith a hydraulic variable speed gear 10 is mounted, the driving shaft 11 thereof being coupled to the engine shaft 12 by means of the coupling 13.

The hydraulic transmission employed is of the general type disclosed in my U. S. Patents Nos. 710,485 and 801,097 and of the special type disclosed in detail in my application, Serial No. 525,925 filed November 2, 1909. I have therefore not shown the details of the same in the drawings of this application but I will now describe so much of the construction and operation of the same as is necessary for an understanding of my present invention.

The forward part 14 of the hydraulic transmission is the casing of a multi-cylinder variable stroke pump driven by shaft 11 and adapted to deliver oil under pressure through passages inclosed in the middle portion of the casing to a hydraulic motor also of the multi-cylinder type inclosed in the rear part 15 of the casing. Means are provided to vary the stroke of the pump pistons so as to vary the amount of fluid delivered to the motor from a maximum flowing in one direction through zero to a maximum amount flowing in the opposite direction so that the motor may be driven in either direction at any speed from the maximum for which the transmission is designed to zero with a torque increasing in the exact proportion that the speed is decreased. The stroke varying means is operated by a reciprocating rod 16 to which is connected a hand lever 17 fulcrumed at 18 on the casing and working in a notched quadrant 19, the parts being so proportioned that the zero position of the pump corresponds with the middle position of the lever, in which it is shown in Fig. 2 of the drawings.

The hydraulic motor drives a shaft 20, journaled in bearings 21, 22 and provided with a worm 23 which meshes with a worm wheel 24 attached to a transverse shaft 25 suitably journaled in the frame at the base of an upstanding arch 26 formed at the rear end of the frame. Also attached to the shaft 25 is a flanged supporting wheel 27 and a spur gear 28, which gear meshes with an idle gear 29 journaled on a stud 30 below the shaft 25. The gear 29 meshes with a second idle gear 31 journaled on a stud 32 mounted in the frame below the stud 30 and this gear 31 meshes with a gear 33 freely rotatable on a shaft 34 which is suitably journaled in a depending arch 35 similar to the arch 26. Attached to or formed integrally with the hub of the gear 33 is a flanged wheel 36 which is adapted to engage the under side of the track 1. The arches 26 and 35 are provided with brackets 37 and 38 respectively extending beyond the journals of the shafts 25 and 34 respectively toward the track 1 and journaled in the brackets are rollers 39, 40, adapted to engage respectively the upper and lower edges of the track opposite the flanges of the wheels 27 and 36 to hold the tractor on the track.

As shown particularly in Fig. 6 the shaft 34 is formed with the middle portion 41, on which the wheel 36 and gear 33 are mounted, eccentric to the ends of the shaft journaled in the frame, and attached to an end of the shaft which projects beyond the frame is an arm 42 to which is loosely connected the rod 43 of a piston 44 working in a cylinder 45 attached to the side of the frame, the arrangement of the parts being such that downward movement of the arm effected by fluid pressure in the cylinder will press the wheel 36 against the track with a force proportional to pressure of the fluid.

As stated above, the hydraulic motor is driven by fluid under pressure delivered to the motor by the pump through suitable passages in the middle part of the casing 10 and to one of these passages a pipe 46 is connected. This pipe leads to a 3-port valve 47 provided with a handle 47′, the purpose of which will be explained hereinafter, and leading from the valve 47 to the cylinder 45 is a pipe 48. When the valve 47 is adjusted to connect the pipes 46 and 48, it is obvious that the driving wheels will be forced against the track with a force proportional to the pressure of the fluid in the main circuit of the hydraulic transmission and this pressure, as will be readily seen and as explained in full in my application above mentioned, is always proportional to the driving torque of the motor shaft as controlled by the lever 17.

The hydraulic transmission disclosed in my above mentioned application embodies a leakage pump mounted in the casing at 49, and driven from the pump shaft 11. This leakage pump is shown in cross section in Fig. 4 and consists of two intermeshing gears 50 and 51 driven by a gear 52 on the shaft 53 of the gear 50, the gear 52 being driven by a gear 53 attached to the pump shaft 11. The suction side of the leakage pump is connected by a pipe 55 to the bottom of the casing in which a reserve supply of oil is stored. In operation the leakage pump forces the oil from the casing through a pipe 56 to the low pressure side of the fluid circuit, the capacity of the leakage pump being such that the quantity of oil delivered is always in excess of that necessary to keep the fluid circuit full of oil, the surplus being returned to the casing through a spring pressed valve whereby a certain degree of back pressure is maintained in the low pressure passages of the main fluid circuit and in the pipe 56. In order that this pressure may be used to cause the driving wheels to grip the track when it is not desired to use the fluid pressure from the main circuit, as for instance when the tractor is running without a tow and a slight pressure is all that is needed, I have connected the pipe 56 to the three port valve 47 by means of a pipe 57. The valve 47 is shown in cross section in Fig. 5 and is so constructed that when the handle 47′ is set in one position the valve body 58 covers the port of the pipe 57 and connects the pipe 46 from the main fluid circuit with the pipe 48 to the cylinder 45 and when the handle is set in another position the valve body covers the port of the pipe 46 and connects the pipe 57 with the pipe 48.

The frame 4 is provided at its rear end with suitable eyes 59 to which the tow line 60 of the canal boat 61 or other load to be moved can be attached, here shown for convenience of illustration as attached to the forward eye for backward movement of the tractor. On top of the arch 26 a seat 62 for the operator is provided.

The operation of the device will now be described.

Assuming that the load to be hauled has been attached to the tractor, and that the engine is running and the control lever 17 is in its zero position, the operator sets the valve 47 to connect the pipe 46 to the pipe 48 of the cylinder 45 and then moves the lever 17 through a very small angle in the direction to cause the tractor to move forward. This movement of the lever causes the pump to deliver oil at a low rate but under very high pressure to the motor and consequently to the cylinder 45 through the pipes 46 and 48, thereby starting the tractor at a very slow speed and at the same time causing the driving wheels to grip the track with great force through the medium of the piston 44, arm 42 and eccentric 41. After the boat or other load has been set in motion the operator may gradually move his lever away from the zero position, until the tractor attains the desired speed. When the tractor is running "light" or without a tow, the operator can relieve the parts of the friction and strain attendant upon the high tractive pressure by adjusting the valve 47 to connect the pipe 57 from the leakage pump instead of the pipe 46 to the cylinder 45, the pressure in the pipe 57 being sufficient to hold the tractor against displacement on or from the track.

I am aware that electric tractors running on a single rail have been proposed for towing purposes but such devices, aside from the great cost of installation and maintenance are open to the objection that they cannot be started as gradually as is requisite for good results and an internal combustion engine, while overcoming the difficulty as regards cost, is entirely inapplicable to such work unless equipped with an intermediate transmission of much greater flexibility than can be obtained with toothed gears. With my improved tractor I am able to obtain a driving torque at starting, when the large inertion due to the great weight of the boat is to be overcome, that is limited only by the strength of the parts of the apparatus and can at the same time give the driving wheels a tractive grip always sufficient to keep them from slipping.

I claim:

1. In a track supported power vehicle, the combination of a vehicle frame a power generator, a driving wheel movable relatively to said frame, means for transmitting the power from the generator to the driving wheel and means operated by power from said power generator for moving the driving wheel relatively to said frame to grip the track which it engages, substantially as described.

2. In a mono-rail tractor, the combination of a frame, supporting wheels therefor, means for driving one of said wheels comprising an internal combustion engine and a variable speed hydraulic gear interposed between said engine and driving wheel, and a non-supporting wheel adapted to engage the rail to hold the tractor on the rail, substantially as described.

3. In a mono-rail tractor, the combination of a frame, supporting wheels therefor, a non-supporting wheel adapted to engage the rail to hold the tractor on the rail means for driving said non-supporting wheel, and means actuated by said driving means for pressing said non-supporting wheel against said track, substantially as described.

4. In a track supported power vehicle, the combination of a vehicle frame, a power generator supported thereby, a driving wheel, means for transmitting the power from said power generator to said driving wheel, and means operated by power from said power generator for causing said driving wheel to grip its track with a force varying directly as the tractive effort exerted, substantially as described.

5. In a mono-rail tractor, the combination of a driving wheel, means for driving said wheel, a wheel adapted to engage under the rail and means operated by said driving means for forcing said last mentioned wheel against the rail with a force varying directly as the tractive effort exerted, substantially as described.

6. In a mono-rail tractor, the combination of a frame, supporting wheels therefor, a wheel adapted to engage under said rail, means for driving one of said supporting wheels and said last mentioned wheel, and means operated by said driving means for causing the wheels driven thereby to grip the track with a force varying directly as the tractive effort exerted, substantially as described.

7. In a track supported power vehicle, the combination of a vehicle frame, a driving wheel movable relative thereto, means for driving said wheel, and fluid pressure operated means for moving said driving wheel toward said frame to cause it to press against its track, substantially as described.

8. In a track supported power vehicle, the combination of a driving wheel, means embodying a variable speed hydraulic gear for driving said wheel, and means operated by the fluid of said hydraulic gear for causing said driving wheel to grip its track, substantially as described.

9. In a track supported power vehicle, the combination of a driving wheel, means embodying a variable speed hydraulic gear for driving said wheel, and means operated by the fluid of said hydraulic gear for causing said driving wheel to grip its track with a force varying directly as the tractive effort exerted, substantially as described.

10. In a mono-rail tractor, the combination of a frame, supporting wheels therefor, means for driving one of said wheels, a non-supporting wheel adapted to engage the rail, and fluid pressure operated means for causing said driven supporting wheel and said non-supporting wheel to grip the rail with a force varying directly as the tractive effort exerted, substantially as described.

11. In a mono-rail tractor, the combination of a frame, supporting wheels therefor, a wheel adapted to engage under said rail, driving means for one of said wheels, fluid pressure operated means for causing said driving wheel to grip the rail, and means operated by said driving means for supplying fluid under pressure to said last named means, substantially as described.

12. In a mono-rail tractor, the combination of a frame, supporting wheels therefor, a wheel adapted to engage under said rail, means for driving one of said supporting wheels and said last mentioned wheel comprising a variable speed hydraulic gear, and means operated by the fluid of said gear for causing said driving wheels to grip the rail, substantially as described.

13. In a track supported power vehicle, the combination of a driving wheel, means for driving the wheel, comprising a variable speed hydraulic gear having means for controlling its speed, means operated by the fluid of said gear for causing said driving wheel to grip its track, and means independent of said gear controlling means for controlling said gripping means, substantially as described.

14. In a track supported power vehicle, the combination of a driving wheel, a power generator, a hydraulic transmission between said power generator and said driving wheel comprising a variable capacity pump having means for controlling its capacity, a hydraulic motor, and passages connecting said pump and motor, of a fluid pressure operated means for causing said driving wheel to grip its track, and means for connecting said last named means to the pressure passage of said hydraulic transmission whereby the pressure of said gripping means varies directly as the tractive effort exerted, substantially as described.

15. In a track supported power vehicle, the combination of a driving wheel, a power generator, a hydraulic transmission between said power generator and said driving wheel comprising a pump, a motor driven by the fluid therefrom, and a leakage pump driven by the power generator, and means adapted to be operated by the fluid pressure generated by said leakage pump for causing said driving wheel to grip the track, substantially as described.

16. In a track supported power vehicle, the combination of a driving wheel, means for driving said wheel embodying a hydraulic transmission having a plurality of fluid passages in which the fluid pressure is different, fluid pressure operated means for causing said driving wheel to grip the track and means for connecting said gripping means to either of said fluid passages, substantially as described.

17. In a track supported power vehicle, the combination of a driving wheel, means for driving said wheel embodying a hydraulic transmission having a plurality of fluid passages in one of which the fluid pressure varies directly as the tractive effort of the vehicle and in another of which the fluid pressure is substantially constant, of fluid pressure operated means for causing said driving wheel to grip its track and means for connecting said gripping means with either of said passages, substantially as described.

18. In a mono-rail tractor, the combination of a frame, supporting wheels therefor, a wheel adapted to engage under said rail, means for driving one of said wheels, and means for causing said under wheel to grip the track comprising a shaft journaled in the frame and provided with an eccentric portion on which said under wheel is journaled, an arm connected to said shaft, a cylinder carried by said frame, a piston working in said cylinder and attached to said arm, and means for supplying fluid under pressure to said cylinder, substantially as described.

19. In a mono-rail tractor, the combination of a frame, supporting wheels therefor, a wheel adapted to engage under said rail, means for driving one of said wheels comprising a variable speed hydraulic gear, a shaft having an eccentric portion supporting said under wheel and arm connected to said shaft, a cylinder carried by the frame, a piston attached to said arm and working in said cylinder, and means for supplying fluid under pressure from said hydraulic transmission to said cylinder, substantially as described.

In testimony whereof, I have signed my name to this specification in the presence of two subscribing witnesses, this 11th day of March 1911.

CHARLES M. MANLY.

Witnesses:
SIGMUND NEWMAN,
ADA I. MILLER.